US010969768B2

United States Patent
Klatt

(10) Patent No.: US 10,969,768 B2
(45) Date of Patent: Apr. 6, 2021

(54) AUTOMATION CONTROL SYSTEM FOR CONTROLLING A SAFETY FUNCTION OF REMOTE MACHINE

(71) Applicant: Deutsche Telekom AG, Bonn (DE)

(72) Inventor: Axel Klatt, Cologne (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 16/772,826

(22) PCT Filed: Nov. 14, 2018

(86) PCT No.: PCT/EP2018/081145
§ 371 (c)(1),
(2) Date: Jun. 15, 2020

(87) PCT Pub. No.: WO2019/120762
PCT Pub. Date: Jun. 27, 2019

(65) Prior Publication Data
US 2020/0379450 A1 Dec. 3, 2020

(30) Foreign Application Priority Data
Dec. 22, 2017 (EP) .................................... 17210455

(51) Int. Cl.
*G05B 19/418* (2006.01)
*G08C 17/02* (2006.01)

(52) U.S. Cl.
CPC ... *G05B 19/41855* (2013.01); *G05B 19/4184* (2013.01); *G05B 19/4186* (2013.01); *G08C 17/02* (2013.01); *G08C 2201/71* (2013.01)

(58) Field of Classification Search
None
See application file for complete search history.

(56) References Cited

U.S. PATENT DOCUMENTS

2010/0177660 A1 7/2010 Liangliang et al.
2015/0282122 A1 10/2015 Kim

FOREIGN PATENT DOCUMENTS

CN 205910583 U 1/2017
WO WO 2010105670 A1 9/2010

*Primary Examiner* — Carlos R Ortiz Rodriguez
(74) *Attorney, Agent, or Firm* — Leydig, Voit & Mayer, Ltd.

(57) ABSTRACT

An automation control system wirelessly controls a safety function of a remote machine. The automation control system comprises a base station and a control receiver. The base station is configured to transmit a control signal for controlling the safety function using a first transmit signal of a first safety channel, and to transmit the control signal using a second transmit signal of a second safety channel. The control receiver comprises: a processor configured to extract a first received version of the control signal from the first received transmit signal, and to extract a second received version of the control signal from the second received transmit signal; and an electrical interface which is connectable with an electrical interface of the machine for controlling the safety function of the machine based on the first received version of the control signal and the second received version of the control signal.

13 Claims, 5 Drawing Sheets

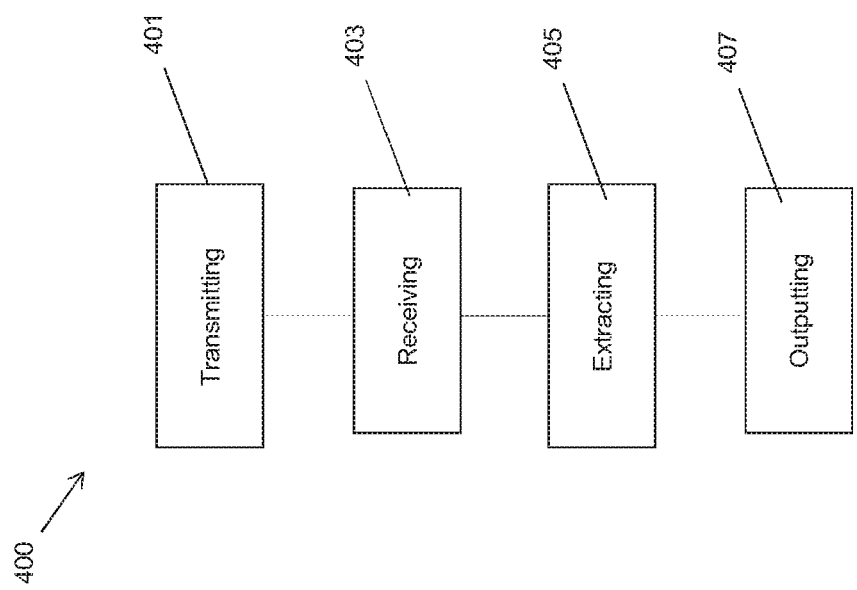

AUTOMATION CONTROL SYSTEM FOR CONTROLLING A SAFETY FUNCTION OF REMOTE MACHINE

CROSS-REFERENCE TO PRIOR APPLICATIONS

This application is a U.S. National Phase Application under 35 U.S.C. § 371 of International Application No. PCT/EP2018/081145, filed on Nov. 14, 2018, and claims benefit to European Patent Application No. EP 17210455.6, filed on Dec. 22, 2017. The International Application was published in English on Jun. 27, 2019 as WO 2019/120762 A1 under PCT Article 21(2).

TECHNICAL FIELD

The present invention relates to the field of automation control systems.

BACKGROUND

Automation control systems are widely deployed for controlling machines in manufacturing industries. In this context, reliable control of safety functions of remote machines, such as emergency stop, is of particular interest. Therefore, the control systems are usually designed as multichannel control systems, having for example two channels for communicating safety related control signals.

In order to transmit a control signal to a machine, a telecommunication infrastructure is required. Traditionally, in order to remotely control a machine, the Profibus technology and the Profinet protocol can be used.

The transmission of the control signals is usually performed using a wired network. However, wired networks are inflexible and expensive, in particular in multichannel control systems. The infrastructure costs associated with wired networks can be reduced using wireless local area network (WLAN) communications. However, WLAN communication systems are designed for short range which is typically 30 m. Moreover, reliability of WLAN communication systems can be reduced in difficult channel conditions, in particular with increasing number of network entities communicating over the WLAN communication infrastructure or other radio technologies interfering by using the same frequency resources as WLAN.

SUMMARY

In an exemplary embodiment, the present invention provides an automation control system for wirelessly controlling a safety function of a remote machine. The automation control system comprises: a base station configured to transmit a control signal for controlling the safety function using a first transmit signal of a first safety channel, and to transmit the control signal using a second transmit signal of a second safety channel, wherein the base station is configured to transmit the first transmit signal and the second transmit signal according to a mobile communications technology; and a control receiver arranged spaced apart from the base station, the control receiver comprising: a communication interface configured to receive the first transmit signal and the second transmit signal; a processor configured to extract a first received version of the control signal from the first received transmit signal, and to extract a second received version of the control signal from the second received transmit signal; and an electrical interface which is connectable with an electrical interface of the machine for controlling the safety function of the machine based on the first received version of the control signal and the second received version of the control signal.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following:

FIG. 4 shows a diagram of a control method in an example; and

Figure 1:
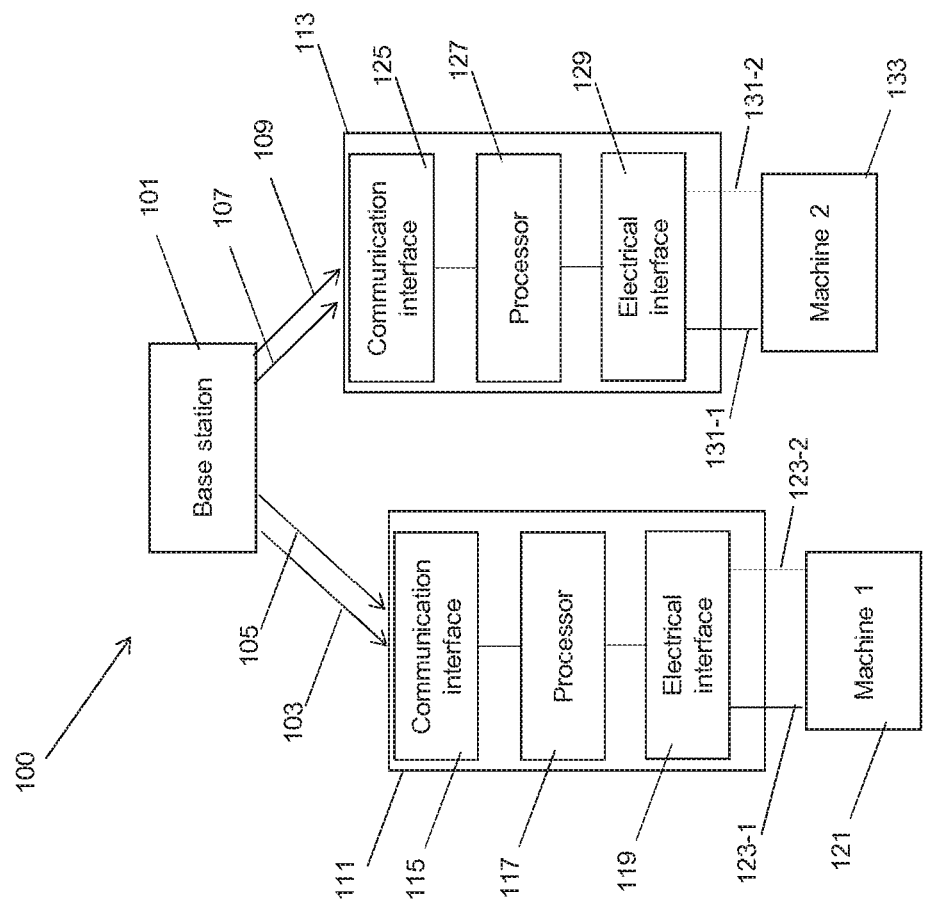
FIG. 1 shows an example of an automation control system.

In the various figures, identical reference signs will be used for identical or at least functionally equivalent features.

DETAILED DESCRIPTION

Exemplary embodiments of the disclosure provide an automation control system with improved telecommunication infrastructure.

In exemplary embodiments of the disclosure, a mobile communication structure, which is usually used for mobile communications of e.g. smartphones, is deployed for wirelessly controlling a machine or an actuator of a machine.

According to a first aspect, the disclosure relates to an automation control system for wirelessly controlling a safety function of remote machine, the automation control system comprising a base station being configured to transmit a control signal for controlling the safety function using a first transmit signal of a first safety channel, and to transmit the control signal using a second transmit signal of a second safety channel, the base station being configured to transmit the first transmit signal and the second transmit signal according to a mobile communications technology, and a control receiver being arranged spaced apart from the base station, the control receiver comprising: a communication interface being configured to receive the first transmit signal and the second transmit signal, a processor being configured to extract a first received version of the control signal from the first received transmit signal, to extract a second received version of the control signal from the second received transmit signal, and an electrical interface which is connectable with an interface of the machine for controlling the safety function of the machine upon the basis of the first received version of the control signal and the second received version of the control signal.

Using mobile communications technology instead of WLAN enables transmitting the control signal via two or more channels according to mobile communication standards. Clearly, the infrastructure costs might be increased when compared to using e.g. WLAN transmission. However, mobile communication technologies support establishing two or more safety channels for transmitting control signals with increased reliability.

The base station can have features of base stations for supporting mobile communications, and can be a micro-cell base station. The cell covered by the base station corresponds to the size of the area with machines that should be controlled.

In order to dedicatedly transmit a control signal towards a respective machine, the control receiver can be uniquely associated or co-located with the machine too be controlled. However, the same control receiver can be associated with several machines.

The control receiver acts in the communication network for example as a subscriber having its own subscriber identity. Therefore, each control receiver and thus each machine can dedicatedly be addressed by the base station.

The control receiver is electrically connectable or connected with the machine using the electrical interface, for example a clamp connector. Therefore, the control signal can be provided to the machine using e.g. the infrastructure for wired connections.

The respectively received version of the control signal corresponds in an example to the transmitted version of the control signal. However, in particular upon noisy channel conditions, the received version of the control signal may be affected by transmission errors, which can be detected by e.g. comparing the received versions of the control signal with each other.

In an embodiment, the remote receiver can be arranged or directly implemented in the machine.

Therefore, according to an embodiment, the automation control system comprises the machine and the remote receiver implemented in the machine.

The base station can communicate with the remote controller using broadcasting or beamforming.

In an embodiment, the base station is configured to generate the control signal for controlling the safety function. Generally, the base station can be configured to control functions of the machine or functions of a plurality of machines. In other words, the base station can implement an automation controller.

However, the automation controller can be a separate entity and can provide the control signals to the base station for transmission using a wired or wireless communication channel.

The automation controller can form another subscriber which communicates with the respective remote controller via the base station, which provides access to the remote controller.

According to an example, the base station is configured to transmit the first transmit signal and the second transmit signal occupying any band that is licensed for mobile communications, in particular a frequency band extending from 1.8 GHz to 6 GHz and/or 24.25 GHz to 29.5 GHz and/or at 31.8 to 33.4 GHz and/or 37 GHz to 40 GHz. This increases the reliability of transmission of the control signal because a licensed frequency band is accessible for fewer authorized entities compared to a non-licensed frequency band.

According to an example, the base station can in addition transmit real time control signals using the licensed frequency band. Other signals, which are non-real-time signals, i.e. not time sensitive signals such as maintenance signals, can be transmitted using the mobile communication technology in non-licensed frequency bands.

According to an example, the base station is configured to transmit the first transmit signal and the second transmit signal according to one of the following communication technologies: Global System for Mobile Communications (GSM), Long Term Evolution (LTE), Long Term Evolution Advanced (LTE-A), Universal Mobile Telecommunications Service (UMTS), High Speed Packet Access (HSPA), 3rd Generation Partnership Project (3GPP), in particular 3GPP NR (New Radio), 5G or IEEE radio systems such as WLAN, WiGig, or any of the evolutions and successors of these technologies.

According to an example, the base station is configured to combine the control signal with a first orthogonal spreading code to obtain the first transmit signal, and to combine the control signal with a second orthogonal spreading code to obtain the second transmit signal.

Thereby, the first transmit signal and the second first transmit signal are at least partially orthogonal with respect to each other, each forming an orthogonal channel for transmission. Thereby, code diversity can be achieved.

According to an example, the processor of the control receiver is configured to combine a receive signal with a code version of the first orthogonal spreading code to obtain the first received transmit signal, and to combine the receive signal with a code version of the second orthogonal spreading code to obtain the second received transmit signal.

The respective code version can be a conjugated transpose version of the respective code, so that orthogonal filtering can be performed.

According to an example, the base station is configured to transmit the first transmit signal using a first transmission beam which is spatially directed towards the control receiver, and to transmit the second transmit signal using a second transmission beam which is spatially directed towards the control receiver.

According to an example, the base station comprises a beamforming antenna with an array of antenna elements, in particular phased antenna elements, wherein the base station is configured to drive the array of antenna elements using a first beamforming signal to generate the first transmission beam, and to drive the array of antenna elements using a second beamforming signal to generate the second transmission beam, the first beamforming signal and the second beamforming signal differing from each other, in particular differing in phase or/and frequency.

The beamforming signals can be associated with a certain phase for generating spatially directed transmission beams.

Thereby, multiple channels forming e.g. safety channels can be established using space diversity or orthogonal coding. The beams can be fixedly directed towards the respective control receiver, and the codes can be fixedly assigned to the control receivers.

According to an example, the base station is configured to drive different sub-arrays of the array of antenna elements to generate the first transmission beam and the second transmission beam.

The subarrays can be driven using different phases in order to generate different beams.

According to an example, the base station is configured to generate the respective transmission beam using a beamforming codebook according to a Multiple Input Multiple Output (MIMO) communication technology.

The codebook can for example indicate an amplitude and/or a phase of a signal driving the respective antenna element or several antenna elements to generate the spatially directed beam. For example, the codebook can have an entry $1+j1$ defining an amplitude and a phase of a complex signal.

According to an example, the communication interface of the control receiver comprises a receiving antenna comprising an array of antenna elements for receiving the first transmission beam and the second transmission beam. Thereby, communication using beam forming can be supported.

According to an example, the automation control system is further adapted for controlling a safety function of a further remote machine arranged spaced apart from the remote machine, further comprising a further remote control receiver being associated with the further remote machine, wherein the base station is configured to transmit a further control signal for controlling the safety function of a further machine using a third transmit signal of a first safety channel, and to transmit the further control signal using a fourth transmit signal of a second safety channel, the base station being configured to transmit the third transmit signal using a third transmission beam which is spatially directed towards the further control receiver, and to transmit the fourth transmit signal using a fourth transmission beam which is spatially directed towards the further control receiver.

Thereby, the base station can communicate with a plurality of control receivers to control a plurality of machines. The control receivers can have corresponding features, so that the description with respect to the remote control receiver correspondingly applies to all remote control receivers.

According to an example, the further control receiver comprises: a communication interface being configured to receive the third transmit signal and the fourth transmit signal, a processor being configured to extract a first received version of the further control signal from the third received transmit signal, to extract a second received version of the further control signal from the fourth received transmit signal; and an electrical interface which is connectable with an interface of the further machine for controlling the safety function of the further machine upon the basis of the first received version of the control signal and the second received version of the control signal.

According to an example, the respective processor is configured to compare the first received version of the respective control signal and the second received version of the respective control signal for detecting a transmission error.

Thereby, transmission errors negatively affecting the control channel can be detected, which increases the system's reliability.

According to an example, the electrical interface of the respective control receiver is adapted for a wired connection with an electrical interface of the respective remote machine or wherein the respective machine interface is a clamp interface.

According to an example, the electrical interface of the respective control receiver comprises a first clamp adapted for outputting the first received version of the respective control signal and a second clamp for outputting the second received version of the respective control signal. Thereby, the two channels can be separately provided to the machine.

According to an example, the respective control receiver comprises a SIM (subscriber identity module) or eSIM (embedded SIM), in particular eUICC (embedded universal integrated circuit card, and a subscriber identity such as IMSI (international mobile subscriber identity) or eID (electronic identity), or ICCID (integrated circuit card identifier).

The base station handles the respective control receiver as a subscriber, so that for communications with the respective remote controller mobile communication protocols can be used.

According to a second aspect, the disclosure relates to a control receiver for controlling a safety function of a remote machine in an automation control system that comprises a base station being configured to transmit a control signal for controlling the safety function using a first transmit signal of a first safety channel, and using a second transmit signal of a second safety channel, the base station being configured to transmit the first transmit signal and the second transmit signal according to a mobile communications technology, wherein the control receiver comprises: a communication interface being configured to receive the first transmit signal and the second transmit signal; a processor being configured to extract a first received version of the control signal from the first received transmit signal, to extract a second received version of the control signal from the second received transmit signal; and an electrical interface which is connectable with an electrical interface of the machine for controlling the safety function of the machine upon the basis of the first received version of the control signal and the second received version of the control signal; wherein the control receiver is arranged spaced apart from the base station.

The control receiver of the second aspect has according to examples the features of the control receiver as described with regard to the first aspect and its examples.

According to a third aspect, the disclosure relates to a machine having a safety function that is controllable by a control signal, the control signal being transmittable by a base station for controlling the safety function using a first transmit signal of a first safety channel, and using a second transmit signal of a second safety channel, the base station being configured to transmit the first transmit signal and the second transmit signal according to a mobile communications technology, wherein the machine comprises: the control receiver of the second aspect, wherein the electrical interface is configured to output the basis of the first received version of the control signal and the second received version of the control signal; and an electrical interface being electrically connectable to the electrical interface of the control receiver for receiving the first received version of the control signal and the second received version of the control signal; and a processor being configured to control the safety function of the machine on the basis of the first received version of the control signal and the second received version of the control signal.

In some examples, the electrical interface of the control receiver is adapted for a wired connection with the electrical interface of the machine, e.g. using an electric connector or a clamp.

In an example, the control receiver is embedded in the machine, so that the electrical interface of the control receiver and the electrical interface are fixedly connected.

In an example, the processor is configured to compare the first received version of the control signal and the second received version of the control signal in order to detect transmission errors. In an error-free transmission, the first received version of the control signal and the second received version of the control signal both can correspond to the transmitted control signal, so that the first received version of the control signal and the second received version of the control signal bot can be using for controlling the machine, in particular an actuator of the machine such as emergency switch or a power switch or a relay.

According to a second aspect, the disclosure relates to an automation control method for wirelessly controlling a safety function of a remote machine with the automation control system according the first aspect, the automation control method comprising: transmitting a control signal for controlling the safety function using a first transmit signal of a first safety channel and transmitting the control signal using a second transmit signal of a second safety channel by the base station according to a mobile communications technology towards the remote control receiver; receiving the first transmit signal and the second transmit signal by the control receiver; extracting a first received version of the control signal from the first received transmit signal and second received version of the control signal from the second received transmit signal; and providing the first received version of the control signal and the second received version of the control signal via the electrical interface of the remote control receiver to the machine in order to control the safety function of the machine.

According to a third aspect, the disclosure relates to a computer program comprising a computer readable program code which, when executed on base station and/or the remote control receiver of the automation control system, performs the method according to the second aspect.

According to a third aspect, the disclosure relates to a computer program product comprising the computer program according to the third aspect.

In the following description, reference is made to the accompanying drawings, which form part of the disclosure, and in which are shown, by way of illustration, specific aspects in which the present invention may be placed. It will be appreciated that other aspects may be utilized and structural or logical changes may be made without departing from the scope of the present invention. The following detailed description, therefore, is not to be taken in a limiting sense, as the scope of the present invention is defined by the appended claims.

For instance, it will be appreciated that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures.

Moreover, in the following detailed description as well as in the claims, embodiments with different functional blocks or processing units are described, which are connected with each other or exchange signals. It will be appreciated that the present invention covers embodiments as well, which include additional functional blocks or processing units that are arranged between the functional blocks or processing units of the embodiments described below.

FIG. 1 shows an automation control system 100 for wirelessly controlling a safety function of a remote machine 121.

The automation control system 100 comprises a base station 101 that is configured to transmit a control signal for controlling the safety function using a first transmit signal 103 of a first safety channel, and to transmit the control signal using a second transmit signal 105 of a second safety channel. The first safety channel and the second safety channel are provided for safe transmission of the control signal, and formed by the respective transmit signal 103, 105.

The base station 101 further comprises a control receiver 111 being arranged spaced apart from the base station 101. The control receiver 111 comprises a communication interface 115 being configured to receive the first transmit signal 103 and the second transmit signal 105, a processor 117 being configured to extract a first received version of the control signal from the first received transmit signal, to extract a second received version of the control signal from the second received transmit signal, and an electrical interface 119 which is connectable or connected with an interface of the machine 121 for controlling the safety function of the machine 121 upon the basis of the first received version of the control signal and the second received version of the control signal.

The base station 101 can be configured to transmit control signals to a plurality of remote control receivers according to the principles described herein. FIG. 1 therefore exemplarily shows a further remote control receiver 113 having a receiving or communication interface 125 being configured to receive a third transmit signal 107 and the fourth transmit signal 109 from the base station 101 that transmits a further control signal further control signal for controlling a safety function of a further machine 133 using the third transmit signal 107 of a first safety channel, and to transmit the further control signal using the fourth transmit signal 109 of a second safety channel.

The further remote control receiver 113 correspondingly comprises a processor 127 being configured to extract a first received version of the further control signal from the third received transmit signal, to extract a second received version of the further control signal from the fourth received transmit signal, and an electrical interface 129 which is connectable with an electrical interface of the further machine, e.g. by clamping, for controlling the safety function of the further machine 133 upon the basis of the first received version of the control signal and the second received version of the control signal.

In an example, the transmission signals 103-109 can be made orthogonal with respect to each other using orthogonal spreading codes, whereby a code division multiple access (CDMA) transmission scheme can be deployed.

In order to provide the control signal to the respective machine 121, 131, the respective electrical interface 119, 129 of the respective control receiver 111, 113 can be adapted for wired connection. The respective electrical interface 119, 129 can comprise a first clamp 123-1, 131-1 adapted for outputting the first received version of the respective control signal and a second clamp 123-2, 131-2 for outputting the second received version of the respective control signal. Thereby, wired connection to the remote machine 121, 131 can be established using well known connectors deployed in automation systems.

Figure 2:
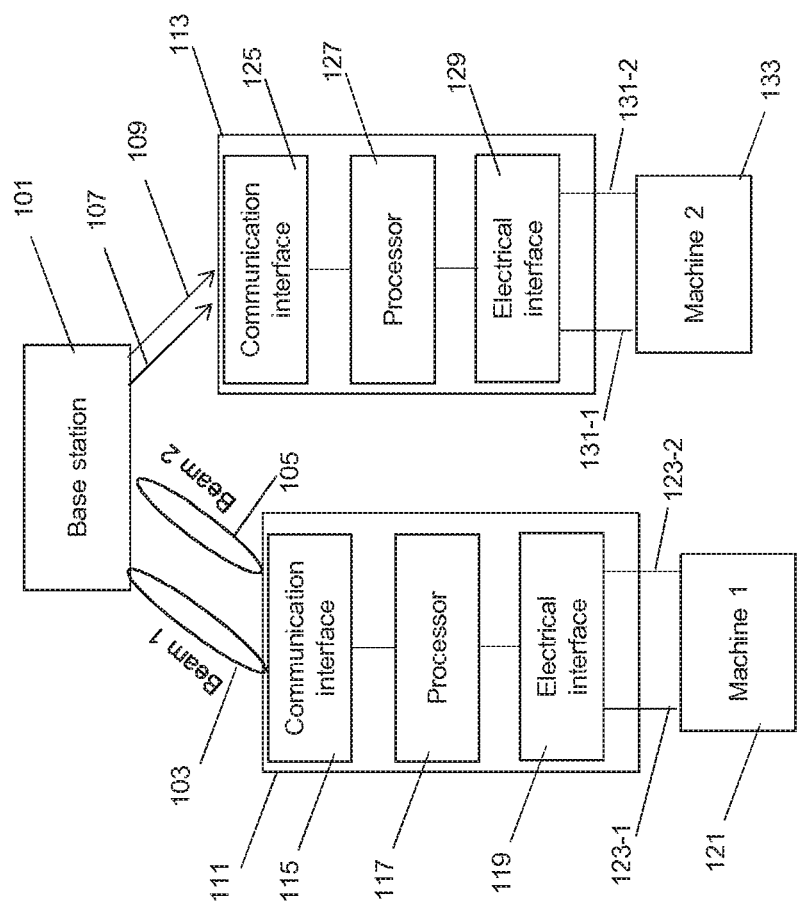
FIG. 2 shows an example of the automation control system.

In another example as shown in FIG. 2, the transmission signals 103-109 can be transmitted using separated transmission beams. However, also a mixture of transmitting methods is possible, where the transmission signals 103, 105 are transmitted using transmission beams, and the transmission signals 107, 109 are transmitted using the CDMA transmission scheme.

The transmit signals 103-109 can be transmitted upon the basis of the Profinet or Profibus scheme.

Figure 3B:
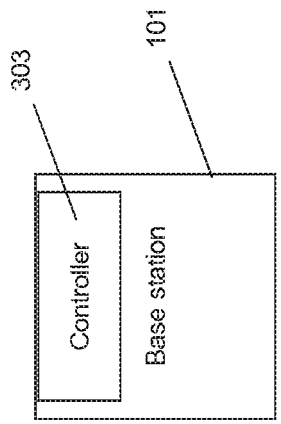
FIGS. 3a) and 3b) show examples of the automation control system.

As depicted in FIG. 3b, the respective control signal for controlling the respective remote machine 121, 133 can be generated in the base station 101, having an integrated automation controller 303.

Figure 3A:
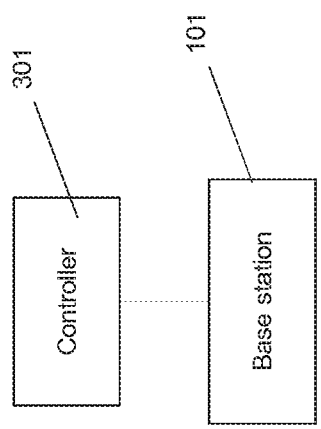

However, as depicted in FIG. 3a, the respective control signal for controlling the respective remote machine 121, 133 can be generated by a remote automation controller 301 which provided the respective control signal to the base station 101 via a wired or wireless communication network. The remote controller 301 can be handled as another subscriber in the communication cell served by the base station 101. Therefore, the remote controller 301 can have its own subscriber identity as described herein, and communicate with the base station 101 using a mobile telecommunication technology as described herein.

In an embodiment, the remote controller 301 can transmit the respective transmit signal 103-109 towards the base station 101 in a multichannel fashion. In this embodiment, the remote controller 301 can initiate a call or a data session towards the respective control receiver 111, 113 using the base station 101.

According to an embodiment, the base station 101 is configured to transmit the first transmit signal 103 and the second transmit signal 105 with the control signal relating to the safety function occupying any band that is licensed for mobile communications, in particular a frequency band extending from 1.8 GHz to 6 GHz and/or 24.25 GHz to 29.5 GHz and/or at 31.8 to 33.4 GHz and/or 37 GHz to 40 GHz.

In addition, the base station 101 can transmit further signals, which e.g. do not relate to controlling safety functions, using frequency bands which are unlicensed and typically used for WLAN (so-called RLAN bands in Europe for example), e.g. RLAN bands at 2.4 GHz, 5.8 GHz or 60 GHz.

In an embodiment, the first transmit signal 103 and the second transmit signal 105 can be transmitted in the same licensed frequency band, or in different licensed frequency bands.

In an embodiment, the first transmit signal 103 and the second transmit signal 105 can be transmitted using different transmission parameters or channel parameters relating to modulation, error coding, data rate, bit error probability, or delay.

In an embodiment, the base station 101 can be configured to transmit real-time communications in one or several licensed frequency bands, and to transmit non-real-time communications in non-licensed frequency bands.

The protocols used to transmit real-time communications such as real-time control and the non-real-time communications such as maintenance functions or software updates or retrieving system information can chose different frequencies or frequency bands.

The protocol stack can comprise for real-time communications and non-real-time communications, i.e. non time critical communications a common standard Ethernet layer.

Real-time communications can be handled using a Profinet real-time channel following the Ethernet layer, whereas non time critical communications can be handled by an IP layer followed by TCP/UDP layer.

The Profinet real-time channel and the TCP/UDP layer can converge in the Profinet application layer.

In an embodiment, real-time communications and non-real-time communications can be mapped on different frequencies or on two frequency bands for double, i.e. redundant, transmission.

FIG. 4 depicts a diagram of an automation control method 400 for wirelessly controlling a safety function of the remote machine 121, the automation control method 400 comprising: transmitting 401 a control signal for controlling the safety function using the first transmit signal 103 of a first safety channel and transmitting the control signal using a second transmit signal 105 of a second safety channel by the base station 101 according to a mobile communications technology towards the remote control receiver 111, receiving 403 the first transmit signal 103 and the second transmit signal 105 by the control receiver, extracting 405 a first received version of the control signal from the first received transmit signal 103 and second received version of the control signal from the second received transmit signal 105, and outputting 407 the first received version of the control signal and the second received version of the control signal via the electrical interface 119 of the remote control receiver 111 to the machine 121 in order to control the safety function of the machine 121.

Figure 5:
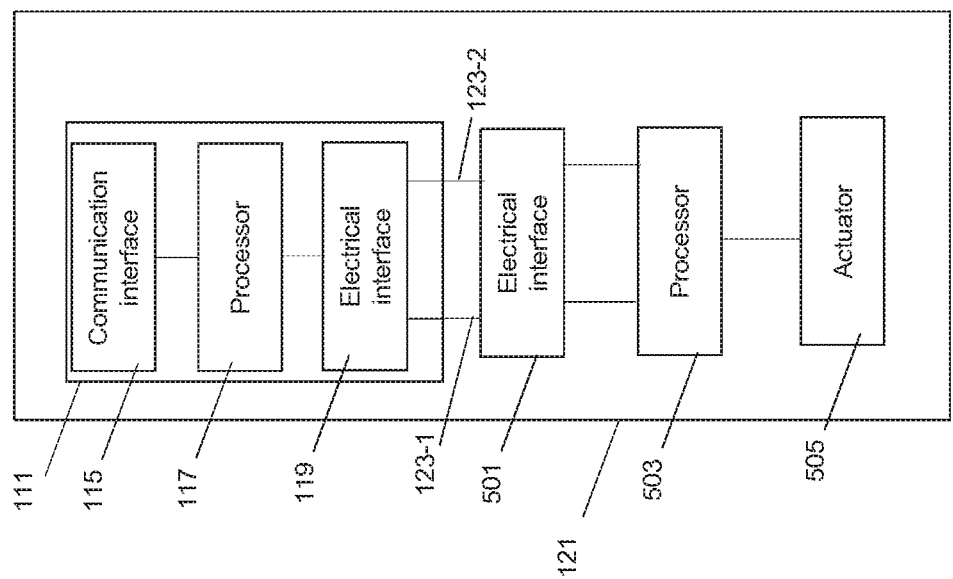
FIG. 5 shows an example of a machine.

FIG. 5 shows a block diagram of the machine 121 having a safety function that is controllable by a control signal, the control signal being transmittable by the base station 101 for controlling the safety function using a first transmit signal of a first safety channel, and using a second transmit signal 103 of a second safety channel, the base station 101 being configured to transmit the first transmit signal 103 and the second transmit signal 105 according to a mobile communications technology, wherein the machine 121 comprises: the control receiver 111, wherein the electrical interface 119 is configured to output the first received version of the control signal and the second received version of the control signal, and an electrical interface 501 being electrically connectable to the electrical interface 119 of the control receiver 111 for receiving the first received version of the control signal and the second received version of the control signal, and a processor 503 being configured to control the safety function of the machine 121 on the basis of the first received version of the control signal and the second received version of the control signal.

In an example, the processor 503 is configured to compare the first received version of the control signal and the second received version of the control signal in order to detect transmission errors. In an error-free transmission, the first received version of the control signal and the second received version of the control signal both can correspond to the transmitted control signal, so that the first received version of the control signal and the second received version of the control signal bot can be using for controlling the machine 121, in particular an optional actuator 505 of the machine 121, such as emergency switch or a power switch or a relay.

The automation control method can further comprise controlling the safety function of the remote machine, e.g. an emergency stop using the first received version of the control signal and the second received version of the control signal, The automation control method can be implemented in hardware and/or in software.

It is understood that the features of the various exemplary aspects described herein may be combined with each other, unless specifically noted otherwise.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless of whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An automation control system for wirelessly controlling a safety function of a remote machine, the automation control system comprising:
   a base station configured to transmit a control signal for controlling the safety function using a first transmit signal of a first safety channel, and to transmit the control signal using a second transmit signal of a second safety channel, wherein the base station is configured to transmit the first transmit signal and the second transmit signal according to a mobile communications technology; and
   a control receiver arranged spaced apart from the base station, the control receiver comprising:
   a communication interface configured to receive the first transmit signal and the second transmit signal;
   a processor configured to extract a first received version of the control signal from the first received transmit signal, and to extract a second received version of the control signal from the second received transmit signal; and
   an electrical interface which is connectable with an electrical interface of the machine for controlling the safety function of the machine based on the first received version of the control signal and the second received version of the control signal.

2. The automation control system of claim 1, wherein the base station is configured to transmit the first transmit signal and the second transmit signal occupying a band that is licensed for mobile communications, in particular a frequency band extending from 1.8 GHz to 6 GHz, 24.25 GHz to 29.5 GHz, 31.8 GHz to 33.4 GHz, and/or 37 GHz to 40 GHz.

3. The automation control system of claim 1, wherein the base station is configured to transmit the first transmit signal and the second transmit signal according to one of the following communication technologies: Global System for Mobile Communications (GSM), Long Term Evolution (LTE), Long Term Evolution Advanced (LTE-A), Universal Mobile Telecommunications Service (UMTS), High Speed Packet Access (HSPA), 3rd Generation Partnership Project (3GPP), in particular 3GPP New Radio (NR), 5G or IEEE radio systems.

4. The automation control system of claim 1, wherein the base station is configured to combine the control signal with a first orthogonal spreading code to obtain the first transmit signal, and to combine the control signal with a second orthogonal spreading code to obtain the second transmit signal.

5. The automation control system of claim 4, wherein the processor of the control receiver is configured to combine a receive signal with a code version of the first orthogonal spreading code to obtain the first received transmit signal, and to combine the receive signal with a code version of the second orthogonal spreading code to obtain the second received transmit signal.

6. The automation control system of claim 1, wherein the base station is configured to transmit the first transmit signal using a first transmission beam which is spatially directed towards the control receiver, and to transmit the second transmit signal using a second transmission beam which is spatially directed towards the control receiver.

7. The automation control system of claim 6, wherein the base station comprises a beamforming antenna with an array of antenna elements, and wherein the base station is configured to drive different sub-arrays of the array of antenna elements to generate the first transmission beam and the second transmission beam, and/or to generate a respective transmission beam using a beamforming codebook according to a Multiple Input Multiple Output (MIMO) communication technology.

8. The automation control system of claim 1, wherein the communication interface of the control receiver comprises a receiving antenna comprising an array of antenna elements for receiving the first transmission beam and the second transmission beam.

9. The automation control system of claim 1, wherein the processor is configured to compare the first received version of the control signal and the second received version of the control signal for detecting a transmission error.

10. The automation control system of claim 1, wherein the control receiver comprises a subscriber identity module (SIM) or embedded SIM (eSIM), in particular embedded universal integrated circuit card (eUICC), and a subscriber identity or (integrated circuit card identifier (ICCID).

11. A control receiver for controlling a safety function of a remote machine in an automation control system that comprises a base station configured to transmit a control signal for controlling the safety function using a first transmit signal of a first safety channel, and using a second transmit signal of a second safety channel, wherein the base station is configured to transmit the first transmit signal and the second transmit signal according to a mobile communications technology, wherein the control receiver comprises:
- a communication interface configured to receive the first transmit signal and the second transmit signal;
- a processor configured to extract a first received version of the control signal from the first received transmit signal, and to extract a second received version of the control signal from the second received transmit signal; and
- an electrical interface which is connectable or connected with an electrical interface of the machine for controlling the safety function of the machine based on the first received version of the control signal and the second received version of the control signal;
- wherein the control receiver is arranged spaced apart from the base station.

12. A machine having a safety function that is controllable by a control signal, the control signal being transmittable by a base station for controlling the safety function using a first transmit signal of a first safety channel, and using a second transmit signal of a second safety channel, wherein the base station is configured to transmit the first transmit signal and the second transmit signal according to a mobile communications technology, wherein the machine comprises:
- the control receiver of claim 11, wherein the electrical interface is configured to output the basis of the first received version of the control signal and the second received version of the control signal; and
- an electrical interface electrically connectable to the electrical interface of the control receiver for receiving the first received version of the control signal and the second received version of the control signal; and
- a processor configured to control the safety function of the machine based on the first received version of the control signal and the second received version of the control signal.

13. An automation control method for wirelessly controlling a safety function of remote machine with the automation control system according to claim 1, the automation control method comprising:
- transmitting a control signal for controlling the safety function using the first transmit signal of a first safety channel and transmitting the control signal using the second transmit signal of a second safety channel by the base station according to a mobile communications technology towards the remote control receiver;
- receiving the first transmit signal and the second transmit signal by the control receiver;
- extracting a first received version of the control signal from the first received transmit signal and second received version of the control signal from the second received transmit signal; and
- providing the first received version of the control signal and the second received version of the control signal via the electrical interface of the remote control receiver to the machine in order to control the safety function of the machine.

* * * * *